June 28, 1932. E. KNAPP ET AL 1,864,740
BRUSH FEED FOR DUSTING MACHINES
Filed Dec. 2, 1927

INVENTORS.
Edgar Knapp & Carl G. Allgrunn.
BY
A. S. McDaniel
THEIR ATTORNEY

Patented June 28, 1932

1,864,740

UNITED STATES PATENT OFFICE

EDGAR KNAPP AND CARL G. ALLGRUNN, OF MIDDLEPORT, NEW YORK, ASSIGNORS TO NIAGARA SPRAYER COMPANY, OF MIDDLEPORT, NEW YORK, A CORPORATION

BRUSH FEED FOR DUSTING MACHINES

Application filed December 2, 1927. Serial No. 237,201.

The present invention relates to a powder dusting mechanism, and more particularly to a device adapted for distributing powders upon vegetation for destroying insects and fungus growth existing thereon.

A device of the general type of which the present invention is primarily intended to be an improvement, is disclosed in the patent issued to Jacob H. Wright, No. 1,188,127. It is the object of the present invention to improve the apparatus disclosed in the said patent to Wright in such a way that a more efficient operation is permitted, and also to provide for a more ready adjustment and repair.

A further object contemplated by this invention is to provide a dusting apparatus in which the openings through which the material being distributed passes from a hopper, will be always kept open and free from lumps of the powdered material.

Figure 1:
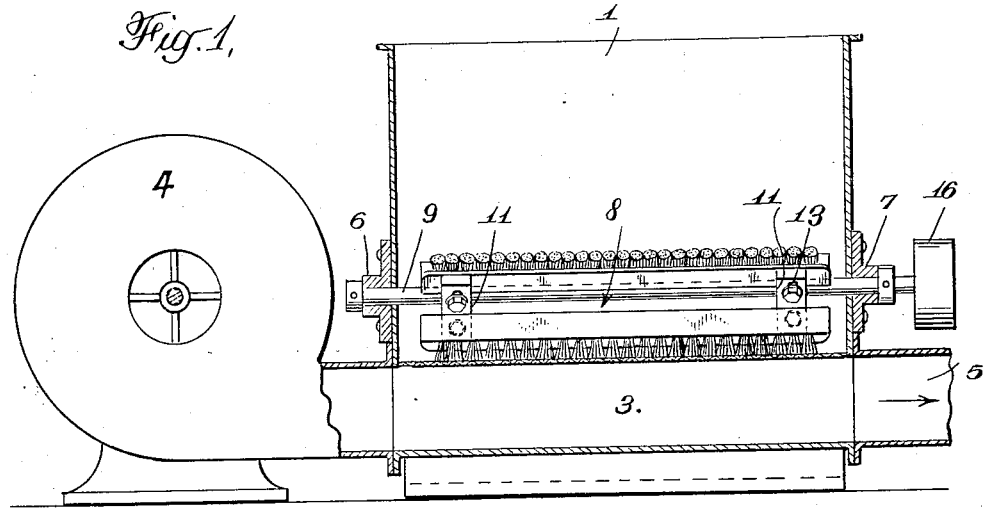
Figure 2:
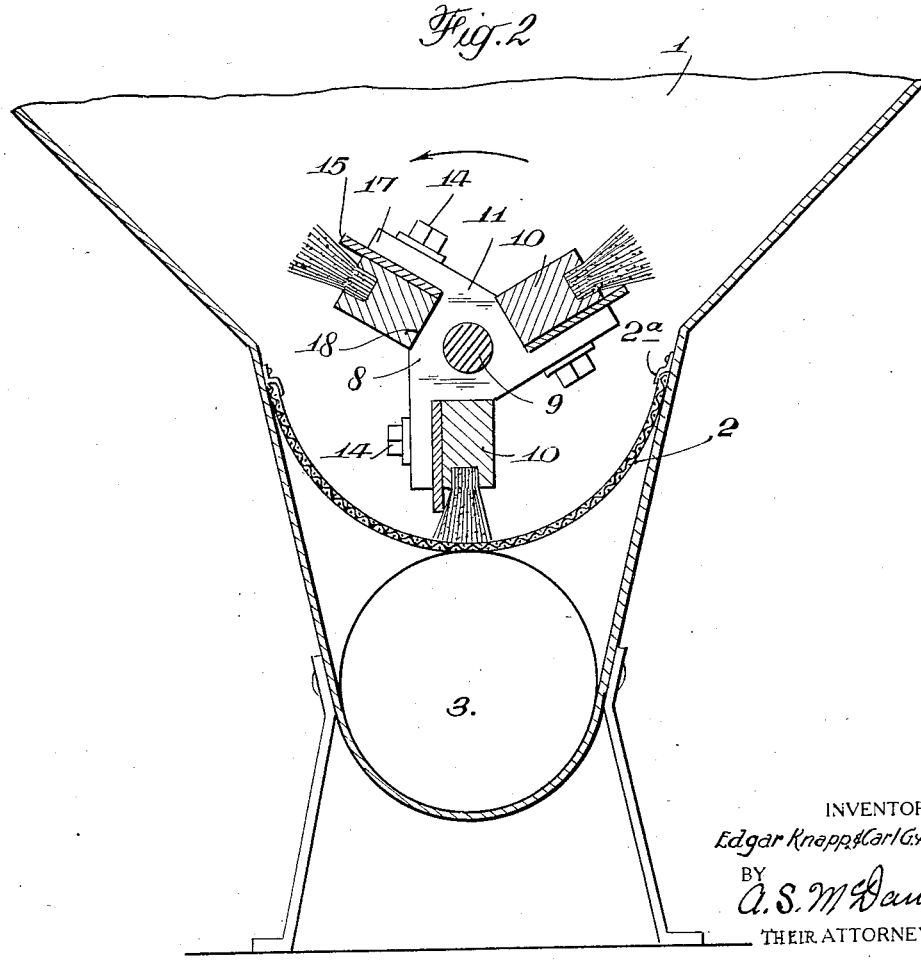

Other objects and advantages will be apparent from the following description when considered in connection with the accompanying drawing, wherein, Figure 1 is a side elevation partly in section of a portion of a powder distributing device embodying our invention; and Fig. 2 is a transverse section through the bottom portion of the hopper and the agitator brush mechanism.

Referring now to the drawing in detail, the reference character 1 designates a hopper for containing a powdered material. At the bottom of this hopper a semi-cylindrical screen or other pervious outlet member 2, adapted to permit the powdered material to be sifted therethrough, is fastened by means of the longitudinal strip 2ª. Beneath this outlet member is an inclosed mixing chamber 3 connected at one end with the blower 4 and at the other end to the conduit 5.

The device illustrated is intended to be mounted on a vehicle and carried near the plants which are to be treated. However, other uses will be apparent in which the apparatus will be stationary.

Mounted in the hopper 1, in bearings 6 and 7 coaxial with the cylindrical screen 2, is a rotary agitator brush member 8. This rotary member comprises a shaft 9 on which the longitudinal brushes 10 are carried by means of spiders 11. The brushes 10 may be secured to the spiders by any suitable means, but they are preferably mounted to permit radial adjustment so as to compensate for wear, the adjustment being permitted by the slots 13, in which the bolts 14 are slidable. Between the brushes 10 and the supporting arms of the spiders 11 are mounted suitable strips 15 which terminate at points adjacent but inwardly of the ends of the bristles of brushes 10. This brush structure 8 is driven by any suitable means, and in this case a belt and pulley are employed, as illustrated at 16.

The spider 11 is preferably formed of an integral member having arms 17 and faces 18 forming recesses into which the brushes 10 and the reinforcing strips 15 are fitted. The number of arms 16 which are employed may be as desired, but it is found in practice that spiders having arms to accommodate three brushes are most satisfactory as that permits the material to fall freely against the screen, and because by employing three brushes, each of the bolts 14 is easily accessible without interference from the other brushes. In order to facilitate the use of a wrench for loosening or setting down the bolts 14, the spiders 11 are spaced from the walls of the hopper 1.

In choosing the brushes 10, it is advisable that the bristles at the advancing edge should be long and flexible in order that they may keep up a constant flicking action against the material that is swept in front of them and prevent its crowding or packing against the screen, while the bristles adjacent the rear portion of the brushes should be relatively stiff.

In operation the hopper 1 is filled with the powdered material; the blower 4, and the brush 8 are then rotated at suitable speeds. As the powder sifts down through the screen 2 into the chamber 3 it is entrained in a blast of air coming from the blower 4 and blown out through the conduit 5 to a suitable discharge nozzle (not shown).

The brush member 8 serves to maintain a uniform flow of the material from the hopper 1 into the chamber 3. This is accomplished, first by agitating the material and thereby preventing the arching of the material across the outlet, and, secondly, by sweeping across the screen 2 whereby the openings are kept clear and the powder is forced therethrough.

Should the powdered material contain lumps, these lumps, of course, come to the feeding outlet where they are held back by the screen 2. Ordinarily, if these lumps are light and loose, they will be swept along in front of the brushes 10, and broken as they are rolled over the rough surface of the screen and are flicked by the bristles. It sometimes happens, however, that the more coherent lumps which may have formed, are not broken in the manner indicated, but such lumps will be caught under the brush on the uphill part of the screen where gravity will combine with the roughness of the screen together with the projecting clip 2ª to retard the lump at this point so that the brushes will pass thereover. The long and flexible bristles at the advancing edge of the brushes are designed to readily flex and permit the lumps of material to pass under them; but the bristles at the rear edge, being reinforced by the strip 15, resist their passage which results in a scraping, scrubbing and piercing action, and thereby effectively reduces the lumps to powder.

By this action to which the powdered material is subjected, it is effectively worked through the screen; the material passing readily under leading bristles and then being forced through the screen by the scrubbing action of the reinforced bristles at the rear edge.

It will thus be seen that a novel brush structure has been provided which cooperates with the screen outlet to secure a perfectly uniform and certain flow of material.

Other advantages in the use of the reinforcing strips 15 will be apparent. For example, the tendency of the bristles to become permanently bent and useless is largely overcome, and it will be less frequently necessary to adjust or replace the brushes when reinforcing means are used.

Of course, even with minimum wear, it will eventually become necessary to adjust the brushes. This adjustment is readily accomplished by loosening the bolts 14, moving the brushes as desired, and setting them again securely in adjusted position. Replacement of the brushes is accomplished in the same manner. The novel form of the spiders 11 and the positioning of the bolts 14 for ready access from the top of the hopper permits of these operations being performed without removing any other part, all of which will be obvious from an inspection of the drawing.

Although we have shown and described the embodiment now preferred by us, it will be obvious to those skilled in this art that changes may be made without departing from the spirit and scope of our invention as set forth in the appended claims. Likewise, although our invention is primarily intended for use in dusting insecticides and fungicides, many other uses will be readily apparent. Thus, we may use it in industrial processes wherever a uniform feed of powdered material is desired, and particularly where it is important that the material be of uniform fineness.

What we claim is:

1. In a dusting machine for dusting parasiticidal dusts upon vegetation, a hopper for containing a powdered material having a filler opening at the top thereof, a semi-cylindrical screen in the bottom of said hopper, and a rotary agitator brush member comprising a shaft coaxial with the screen, spiders on said shaft having tangential arms, radial brushes adjustably mounted on said spider arms moving in contact with said screen, means for reinforcing the bristles at the rear edges of said brushes and means for securing the brushes on the spider arms, said means being positioned for ready access from the filler opening at the top of the hopper, and fastening means for said screen constituting a longitudinal rib to catch lumps of the material and crowd them under the revolving brushes, a mixing chamber positioned below the screen, and means for producing a current of gas through said mixing chamber.

2. In a dusting machine for dusting parasiticidal dusts upon vegetation, a hopper, a pervious outlet and a brush for moving over said pervious outlet, said brush having a reinforcing member extending along substantially its entire rear edge with respect to its direction of motion, said reinforcing member acting to reinforce the brush at a substantial distance from the base thereof whereby the effective length of the bristles at that edge is reduced, a mixing chamber positioned below the pervious outlet, and a means for producing a current of gas through said mixing chamber.

3. In a dusting machine for dusting parasiticidal dusts upon vegetation, a pervious member and a brush member contacting therewith, said brush member having a portion of its bristles elastic and easily flexed and another portion resisting flexing, a mixing chamber positioned below said pervious member, and means for causing a current of gas to flow through said mixing chamber.

4. In a dusting machine for dusting parasiticidal dusts upon vegetation, a pervious member, a brush member contacting therewith having the bristles at its leading edge readily flexed and the bristles at its rear edge resisting flexing, and a longitudinal rib on said pervious member for catching any lumps in the material and cause them to be caught under the brush, a mixing chamber positioned below said pervious member and means for causing a current of gas to flow through said mixing chamber.

5. In a dusting machine for dusting parasiticidal dusts upon vegetation, a rough surfaced pervious member, a brush member contacting therewith and having the bristles at its leading edge elastic and easily flexed and those at its rear edge to resist flexing, a mixing chamber positioned below said pervious member and means for causing a current of gas to flow through said mixing chamber.

6. In a dusting machine for dusting parasiticidal dusts upon vegetation, a hopper for containing a supply of material having a filler opening at its top, a pervious member, a rotary agitator in the hopper comprising a shaft, longitudinal agitator members, spiders mounted on said shaft having tangential integral arms for adjustably carrying the agitator members, and adjustable fastening means positioned on the spiders for ready access from the filler opening of the hopper without disturbing other parts of the apparatus, a mixing chamber positioned below said pervious member, and means for causing a current of gas to flow through said mixing chamber.

In testimony whereof we affix our signatures.

EDGAR KNAPP.
CARL G. ALLGRUNN.